United States Patent Office 3,296,447
Patented Jan. 3, 1967

3,296,447
7-UREIDO-2,4-DIOXO-1,2,3,4,5,6-HEXAHYDRO-PYRIDO[2,3-d]-PYRIMIDINES
Viktor Papesch, Morton Grove, Ill., assignor to G. D. Searle & Co., Chicago, Ill., a corporation of Delaware
No Drawing. Filed Oct. 19, 1965, Ser. No. 498,143
9 Claims. (Cl. 260—256.4)

The present invention relates to compounds having a urea group as a substituent on a heterocyclic nucleus. More particularly, it relates to a group of compounds having the following general formula

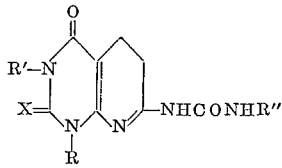

wherein X is selected from the group consisting of O and S; R is selected from the group consisting of lower alkyl, lower alkenyl, cyanoethoxyethyl, and N-ethylcarbamoyloxyethyl; R' is selected from the group consisting of lower alkyl and cyanoethyl; and R" is selected from the group consisting of lower alkyl, lower alkenyl, cyclohexyl, phenyl, and benzenesulfonyl.

The lower alkyl radicals referred to above contain up to 6 carbon atoms and can be exemplified by radicals such as methyl, ethyl, propyl, isopropyl, butyl, and hexyl. The lower alkenyl radicals referred to above likewise contain up to 6 carbon atoms and can be exemplified by radicals such as allyl and methallyl. Furthermore, when R" in the above formula is phenyl or benzenesulfonyl, the benzene ring can be further substituted with groups such as methyl, chloro, or methoxy.

The compounds of this invention are useful because of their pharmacological properties. In particular, the present compounds are useful because of their hypotensive activity. Thus, they have been found to reduce blood pressure in both anesthetized and unanesthetized dogs. The effect has been found to be chronic rather than acute in nature. Those compounds in which R" is ethyl are particularly preferred for their anti-hypertensive properties.

The present compounds also possess activity as anti-ulcer agents and appetite inhibitors. They also possess anti-inflammatory activity which is demonstrated by a phenylbutazone-like effect on edematous conditions. In addition, they possess activity as anti-bacterial agents and this is demonstrated by their inhibition of the growth of the organisms *Bacillus subtilus* and *Escherichia coli.*

The compounds of the present invention are conveniently prepared from the appropriate 1,3-disubstituted 7-amino - 2,4 - dioxo - 1,2,3,4,5,6 - hexahydropyrido[2,3-d]-pyrimidine by reaction with the appropriate isocyanate in an inert solvent such as benzene. The reaction mixture is ordinarily heated to carry out the process.

The following examples are presented to further illustrate the present invention; they should not be construed as limiting it in spirit or in scope. In these examples, quantities are indicated in parts by weight unless parts by volume are specified and temperatures are indicated in degrees centigrade (° C.). The relationship between parts by weight and parts by volume is the same as that existing between grams and milliliters.

*Example 1*

A mixture of 5 parts of 7-amino-1,3-diethyl-2,4-dioxo-1,2,3,4,5,6 - hexahydropyrido[2,3-d] - pyrimidine and 8 parts of ethyl isocyanate in 700 parts of benzene is refluxed for 20 minutes and then filtered to remove a small amount of insoluble material. Refluxing is then resumed for an additional hour. The resultant solution is then concentrated, filtered hot, and then cooled. The solid which crystallizes is separated and recrystallized from benzene to give 1,3-diethyl-7-(3-ethylureido)-2,4-dioxo-1,2,3,4,5,6-hexahydropyrido[2,3-d]pyrimidine melting at about 211–212° C. and then partially resolidifying at 223° C. This compound has the following formula

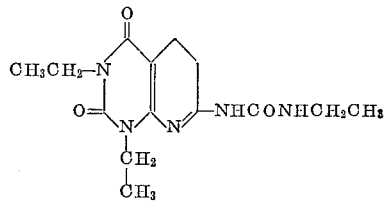

*Example 2*

A mixture of 20 parts of 7-amino-1,3-diethyl-2,4-dioxo-1,2,3,4,5,6-hexahydropyrido[2,3-d]pyrimidine, 19.2 parts of methyl isocyanate, and 2700 parts of benzene is refluxed for about 4 hours. The resultant hot solution is filtered and the benzene solvent is distilled from the filtrate to concentrate it to about ½ the original volume. The resultant concentrated solution is then cooled to permit crystallization and then filtered to separate recrystallized solid. The separated solid is washed by suspending it three times in benzene and then twice in pentane. It is finally recrystallized from benzene to give 1,3-diethyl-7-(3 - methylureido) - 2,4 - dioxo - 1,2,3,4,5,6 - hexahydropyrido[2,3-d]pyrimidine melting at about 202–204° C.

*Example 3*

5 parts of 7-amino-1,3-diethyl-2,4-dioxo-1,2,3,4,5,6-hexahydropyrido[2,3-d]pyrimidine is ground fine, mixed with 7 parts of n-propyl isocyanate and 700 parts of benzene, and refluxed for 75 minutes. The resultant solution is filtered hot and then concentrated to a small volume. The hot concentrated solution is then filtered and cooled. The solid which separates is filtered, washed with benzene and absolute ether, and then recrystallized from benzene to give 1,3 - diethyl - 7 - (3 - propylureido) - 2,4, - dioxo-1,2,3,4,5,6-hexahydropyrido[2,3-d]pyrimidine melting at about 202–202.5° C.

*Example 4*

A solution of 5.2 parts of 7-amino-1,3-diethyl-2,4-dioxo - 1,2,3,4,5,6 - hexahydropyrido[2,3-d]pyrimidine, 360 parts of benzene, and a toluene solution of 4 parts of isopropyl isocyanate is refluxed for 3 hours and then filtered hot. The filtrate is concentrated to about ½ the original volume and then cooled. The solid which precipitates is separated by filtration and washed with benzene and ether. It is then recrystallized from benzene to give 1,3-diethyl - 7 - (3-isopropylureido) - 2,4 - dioxo-1,2,3,4,5,6-hexahydropyrido[2,3-d]pyrimidine melting at about 203–204° C.

*Example 5*

7 parts of 7-amino - 1,3 - diethyl-2,4-dioxo-1,2,3,4,5,6-hexahydropyrido[2,3-d]pyrimidine, 5 parts of cyclohexyl isocyanate, and 580 parts of benzene is refluxed for 3.5 hours. The mixture is filtered hot to remove some solid and the filtrate is cooled. The solid which forms in the filtrate is separated and recrystallized twice from methanol to give 1,3-diethyl-7(3-cyclohexylureido)-2,4-dioxo-1,2,3,4,5,6-hexahydropyrido[2,3-d]pyrimidine melting at about 227–228° C.

*Example 6*

A solution of 4 parts of 7-amino-1,3-diethyl-2,4-dioxo-1,2,3,4,5,6-hexahydropyrido[2,3-d]pyrimidine and 7 parts of allyl isocyanate in 360 parts of benzene is refluxed for 3 hours and then filtered hot. The filtrate is then cooled and the solid which precipitates is separated and recrystallized from benzene to give 1,3-diethyl-7-(3-allylureido)-2,4-dioxo - 1,2,3,4,5,6 - hexahydropyrido[2,3-d]pyrimidine melting at about 208–209° C.

*Example 7*

5 parts of 7-amino - 1,3 - diethyl-2,4-dioxo-1,2,3,4,5,6-hexahydropyrido[2,3-d]pyramidine is ground fine, mixed with 10 parts of phenyl isocyanate and 700 parts of benzene, and refluxed for 75 minutes. The mixture is then cooled and the solid which precipitates is separated by filtration. It is recrystallized from a mixture of dimethylformamide and benzene to give 1,3-diethyl-7-(3-phenylureido)-2,4-dioxo - 1,2,3,4,5,6 - hexahydropyrido[2,3-d]pyrimidine melting at about 224–225° C.

*Example 8*

A mixture of 6.3 parts of 7-amino-1,3-diethyl-2,4-dioxo-1,2,3,4,5,6-hexadropyrido[2,3-d]pyrimidine, 680 parts of benzene, and 10 parts of p-toluenesulfonyl isocyanate is refluxed for 3 hours and then filtered hot to separate the solid product. The solid is washed with benzene and then recrystallized from aqueous methanol to give 1,3-diethyl-7-[3-(p-toluenesulfonyl)ureido] - 2,4 - dioxo-1,2,3,4,5,6-hexahydropyrido[2,3-d]pyrimidine melting at about 194–195° C.

*Example 9*

A solution of 0.9 parts of 7-amino-1,3-diethyl-4-oxo-2-thio - 1,2,3,4,5,6 - hexahydropyrido[2,3-d]pyrimidine 1.2 parts of ethyl isocyanate, and 70 parts of benzene is refluxed for 3 hours and then cooled. The solid which precipitates is separated by filtration, washed with benzene, and then recrystallized from benzene to give 1,3-diethyl-7-(3-ethylureido)-4-oxo - 2 -thio-1,2,3,4,5,6-hexahydropyrido[2,3-d]pyrimidine melting at about 227–228° C.

This compound has the following formula

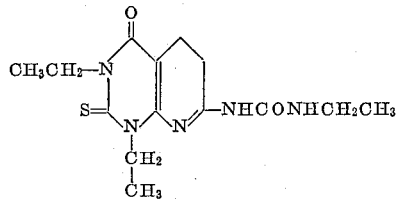

*Example 10*

1 part of 7-amino-1,3-dimethyl-2,4-dioxo-1,2,3,4,5,6-hexahydropyrido[2,3-d]pyrimidine is ground fine and mixed with 25 parts of 50% dimethylformamide in benzene and 5 parts of ethyl isocyanate and refluxed on a steam bath for 3 hours. The mixture is then filtered hot to separate the precipitated product. This product is 1,3-dimethyl-7-(3-ethylureido)-2,4-dioxo - 1,2,3,4,5,6 - hexahydropyrido[2,3-d]pyrimidine and it melts above 330° C.

*Example 11*

3.2 parts of 7-amino-1-ethyl-3-methyl-2,4-dioxo-1,2,3,4,5,6-hexahydropyrido[2,3-d]pyrimidine, 3.9 parts of methyl isocyanate, and 360 parts of benzene is refluxed for 3 hours. The mixture is then allowed to stand for 16 hours and the solid which precipitates is separated and recrystallized from aqueous methanol to give 1-ethyl-3-methyl-7-(3-methylureido)-2,4-dioxo - 1,2,3,4,5,6 - hexahydropyrido[2,3-d]pyrimidine melting at about 295–297° C.

*Example 12*

4 parts of 7-amino-1-ethyl-3-methyl-2,4-dioxo-1,2,3,4,5,6-hexahydropyrido[2,3-d]pyrimidine is ground fine and mixed with 4 parts of ethyl isocyanate and 360 parts of benzene. This mixture is refluxed for 1 hour before it is filtered hot to remove some solids and the resultant filtrate is refluxed for an additional 1.5 hours. The mixture is then cooled and filtered to remove the precipitated solid. This solid is recrystallized from benzene to give 1-ethyl-3-methyl-7-(3-ethylureido)-2,4-dioxo - 1,2,3,4,5,6 - hexahydropyrido[2,3-d]pyrimidine melting at about 297° C.

*Example 13*

A mixture of 5 parts of 7-amino-3-ethyl-1-methyl-2,4-dioxo - 1,2,3,4,5,6 - hexahydropyrido[2,3-d]pyrimidine, 6 parts of ethyl isocyanate, and 360 parts of benzene is refluxed for 3 hours on a steam bath. The mixture is filtered hot to separate the solid product which is recrystallized from dimethylformamide to give 3-ethyl-1-methyl-7-(3-ethylureido)-2,4-dioxo - 1,2,3,4,5,6- hexahydropyrido[2,3-d]pyrimidine which softens at about 277° C. before melting at about 289–292° C.

*Example 14*

A mixture of 3 parts of 7-amino-3-ethyl-1-methyl-2,4-dioxo-1,2,3,4,5,6 - hexahydropyrido[2,3 - d]pyrimidine, 3 parts of isopropyl isocyanate (as a toluene solution), and 900 parts of benzene is refluxed for 3 hours and then filtered hot to remove solid material. The filtrate is then allowed to stand at room temperature for 16 hours before it is filtered to collect the solid which crystallizes. This solid is recrystallized first from benzene and then from a mixture of dimethylformamide and methanol to give 3-ethyl-1-methyl-7-(3 - isopropylureido)-2,4-dioxo-1,2,3,4,5,6-hexahydropyrido[2,3 - d]pyrimidine melting at about 297–298° C.

*Example 15*

A mixture of 3 parts of 7-amino-1-ethyl-3-propyl-2,4-dioxo-1,2,3,4,5,6 - hexahydropyrido[2,3 - d]pyrimidine, 3 parts of ethyl isocyanate, and 90 parts of benzene is refluxed for 90 minutes and then filtered hot. The resultant filtrate is allowed to stand at room temperature and then cooled. The solid which precipitates is separated by filtration and washed with benzene. It is 1-ethyl-3-propyl-7-(3-ethylureido)-2,4-dioxo-1,2,3,4,5,6 - hexahydropyrido[2,3-d]pyrimidine and it softens at about 187° C. before melting at about 192–194° C.

*Example 16*

2.3 parts of 7-amino-1-allyl-3-ethyl-2,4-dioxo-1,2,3,4,5,6-hexahydropyrido[2,3-d]pyrimidine, 5 parts of ethyl isocyanate, and 70 parts of benzene is refluxed for 75 minutes and then filtered hot. The filtrate is cooled in an ice bath and then filtered to remove the precipitated solid. The solid is washed with ether to give 1-allyl-3-ethyl-7-(3-ethylureido)-2,4-dioxo-1,2,3,4,5,6 - hexahydropyrido[2,3-d]pyrimidine which softens at about 195° C. before melting at about 196–197° C. This compound has the following formula

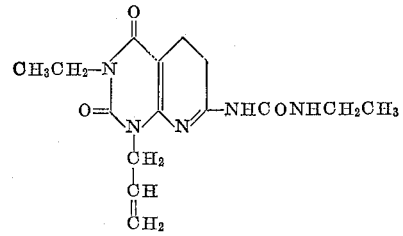

*Example 17*

2.5 parts of methyl isocyanate is reacted with 5 parts of 7 - amino-1-methallyl-3-methyl-2,4-dioxo - 1,2,3,4,5,6-hexahydropyrido[2,3-d]pyrimidine in 450 parts of benzene by refluxing the mixture for about 4 hours. The mixture is then allowed to stand for 16 hours before it is filtered to collect the precipitated solid. This solid is recrystallized from benezene to give 1-methallyl-3-methyl-7-(3-methylureido)-2,4-dioxo-1,2,3,4,5,6-hexahydropyrido[2,3-d]pyrimidine melting at about 236–238° C.

*Example 18*

A mixture of 12 parts of 7-amino-1-methallyl-3-methyl-2,4-dioxo-1,2,3,4,5,6 - hexahydropyrido[2,3-d]pyrimidine, 14 parts of ethyl isocyanate, and 900 parts of benzene is refluxed for 1 hour. Some insoluble material is present so the mixture is further diluted with benzene and refluxed for an additional 3 hours. The mixture is then cooled in an ice bath. It is filtered to collect the precipitated solid which is washed by suspension in benzene and then recrystallized from benzene to give 1-methallyl-3-methyl-7-(3-ethylureido)-2,4-dioxo-1,2,3,4,5,6-hexahydropyrido[2,3-d]pyrimidine melting at about 210–212° C.

Example 19

7.8 parts of 7-amino-3-(2-cyanoethyl)-1-propyl-2,4-dioxo-1,2,3,4,5,6-hexahydropyrido[2,3 - d]pyrimidine, 11 parts of ethyl isocyanate, and 760 parts of benzene is refluxed for 3.5 hours and then filtered hot. The filtrate is concentrated to about ½ the original volume and then cooled. The solid which precipitates is separated by filtration and recrystallized, first from benzene and then from aqueous methanol, to give 3-(2-cyanoethyl)-1-propyl-7-(3 - ethylureido)-2,4-dioxo - 1,2,3,4,5,6 - hexahydropyrido[2,3-d]pyrimidine melting at about 196–197° C.

Example 20

3.6 parts of 7-amino-1-[2-(2-cyanoethoxy)-ethyl]-3-ethyl - 2,4 - dioxo - 1,2,3,4,5,6-hexahydropyrido[2,3-d]pyrimidine, 10 parts of ethyl isocyanate, and 360 parts of benzene are refluxed for 3 hours and then filtered hot. The mixture is allowed to stand at room temperature for 16 hours before it is filtered to collect the precipitated product. This solid is recrystallized from benzene to give 1-[2-(2-cyanoethoxy)ethyl]-3-ethyl-7-(3 - ethylureido)-2,4 - dioxo - 1,2,3,4,5,6 - hexahydropyrido[2,3-d]pyrimidine melting at about 196° C.

Example 21

A mixture of 0.8 part of 7-amino-3-ethyl-1-(2-hydroxyethyl) - 2,4 - dioxo-1,2,3,4,5,6-hexahydropyrido[2,3-d]pyrimidine, 1.5 parts of ethyl isocyanate, and 135 parts of benzene is refluxed for 4 hours and then cooled in an ice bath. The mixture is filtered to collect the precipitated solid which is recrystallized from aqueous methanol to give 3-ethyl-1-[2-(N-ethylcarbamoyloxy)ethyl]-7-(3-ethylureido)-2,4-dioxo - 1,2,3,4,5,6-hexahydropyrido[2,3 - d] pyrimidine melting at about 215–216° C.

Example 22

A mixture of 90 parts of 6-amino-1-methallyl-3-methyluracil, 300 parts by volume of a 50% by volume pyridine-water mixture, 72 parts of acrylonitrile, and 3 parts by volume of a 40% aqueous solution of trimethylbenzylammonium hydroxide is heated on a steam bath for 15 minutes and then distilled under reduced pressure to remove volatile materials. Aqueous methanol is added to the residue which is then distilled to dryness and this process is repeated a second time. The resultant residue is heated with 135 parts of ethyl acetate and filtered hot. The solid thus collected is washed first with ethyl acetate and then with ether to give 7-amino-1-methallyl-3-methyl-2,4-dioxo-1,2,3,4,5,6-hexahydropyrido[2,3-d]pyrimidine melting at about 255–257° C.

Example 23

A mixture of 20 parts of 6-amino-1,3-diethylthiouracil, 25 parts by volume of a 50% by volume pyridine-water mixture, 32 parts of acrylonitrile, and 5 parts by volume of a 40% aqueous solution of trimethylbenzylammonium hydroxide is refluxed for 5.5 hours. Volatile materials are removed from the mixture by distillation and aqueous methanol is added to the residue and distillation is repeated. The resultant residue is dissolved in 5% methanol in ethyl acetate and chromatographed on a silica gel column. The column is first eluted with 5% methanol in ethyl acetate and the first fractions obtained are combined and stirred with 10% methanol in ethyl acetate. The precipitate which forms is separated by filtration and recrystallized from 25% methanol in ethyl acetate to give 7-amino-1,3-diethyl-4-oxo-2-thio-1,2,3,4,5,6 - hexahydropyrido[2,3-d]pyrimidine melting at about 228–229° C.

Example 24

15 parts of 6-amino-1-ethyl-3-propyluracil, 60 parts by volume of a 50% by volume pyridine-water mixture, 12 parts of acrylonitrile, and 1.5 parts by volume of a 40% aqueous solution of trimethylbenzylammonium hydroxide are mixed and refluxed on a steam bath for 2.5 hours. The volatile materials are evaporated from the mixture; aqueous methanol is added to the residue and then distilled off and this procedure is repeated once. The resultant syrupy residue is stirred with hot ethyl acetate and filtered. The solid thus obtained is washed repeatedly by suspension in 50% ethyl acetate and then recrystallized from ethyl acetate to give 7-amino-1-ethyl-3-propyl-2,4-dioxo-1,2,3,4,5,6 - hexahydropyrido[2,3 - d]pyrimidine melting at about 178–179.5° C.

Example 25

A mixture of 35 parts of 6-amino-3-ethyl-1-methyluracil, 120 parts by volume of a 50% by volume pyridine-water mixture, 9 parts by volume of a 40% aqueous solution of trimethylbenzylammonium hydroxide, and 28 parts of acrylonitrile is refluxed for 4 hours. The resultant mixture is filtered hot to remove a small amount of insoluble material and it is then allowed to cool. The solid which precipitates is separated by filtration and recrystallized from methanol to give 7-amino-3-ethyl-1-methyl-2,4-dioxo-1,2,3,4,5,6-hexahydropyrido[2,3-d]pyrimidine melting at about 303–305° C.

What is claimed is:

1. A compound of the formula

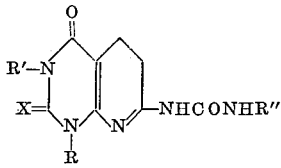

wherein X is selected from the group consisting of O and S; R is selected from the group consisting of lower alkyl, lower alkenyl, cyanoethoxyethyl, and N-ethylcarbamoyloxyethyl; R' is selected from the group consisting of lower alkyl and cyanoethyl; and R'' is selected from the group consisting of lower alkyl, lower alkenyl, cyclohexyl, phenyl, and p-toluenesulfonyl.

2. A compound of the formula

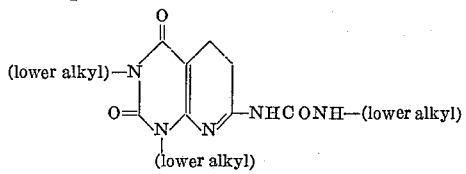

3. A compound of the formula

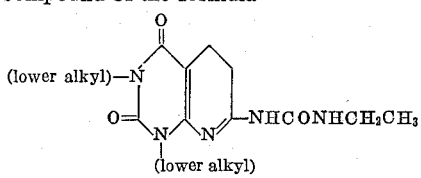

4. 3-ethyl-1-methyl-7-(3-ethyluredio)-2,4-dioxo - 1,2,3,4,5,6-hexahydropyrido[2,3-d]pyrimidine.

5. 1,3-diethyl-7-(3-ethyluredio)-2,4-diozo - 1,2,3,4,5,6-hexahydropyrido[2,3-d]pyrimidine.

6. 1-ethyl-3-methyl-7-(3-ethylureido)-2,4-dioxo - 1,2,3,4,5,6-hexahydropyrido[2,3-d]pyrimidine.

7. 1,3-diethyl-7-[3-(p-toluenesulfonyl)ureido]-2,4 - dioxo-1,2,3,4,5,6-hexahydropyrido[2,3-d]pyrimidine.

8. 1-ethyl-3-methyl-7-(3-methylureido)-2,4-dioxo - 1,2,3,4,5,6-hexahydropyrido[2,3-d]pyrimidine.

9. 1.3-diethyl-7-(3-propylureido)-2,4-dioxo - 1,2,3,4,5,6-hexahydropyrido[2,3-d]pyrimidine.

No references cited.

ALEX MAZEL, *Primary Examiner.*

M. O'BRIEN, *Assistant Examiner.*

UNITED STATES PATENT OFFICE
CERTIFICATE OF CORRECTION

Patent No. 3,296,447 January 3, 1967

Viktor Papesch

It is hereby certified that error appears in the above numbered patent requiring correction and that the said Letters Patent should read as corrected below.

Column 2, line 64, for "-7(3-" read -- -7-(3- --; column 3, line 19, for "-hexadropyrido" read -- -hexahydropyrido --; column 6, line 62, for "-2,4-diozo-" read -- -2,4-dioxo- --; line 70, for "1.3-" read -- 1,3- --.

Signed and sealed this 24th day of October 1967.

(SEAL)
Attest:

Edward M. Fletcher, Jr.  
Attesting Officer

EDWARD J. BRENNER  
Commissioner of Patents